May 6, 1952  F. J. PERILLO ET AL  2,595,978
FILMSTRIP TRANSPORTING MECHANISM
Filed April 12, 1950  2 SHEETS—SHEET 1

INVENTORS
Florindo J. Perillo
David Pollan
By Williams, Rich & Moore
Attorneys

May 6, 1952  F. J. PERILLO ET AL  2,595,978
FILMSTRIP TRANSPORTING MECHANISM
Filed April 12, 1950  2 SHEETS—SHEET 2
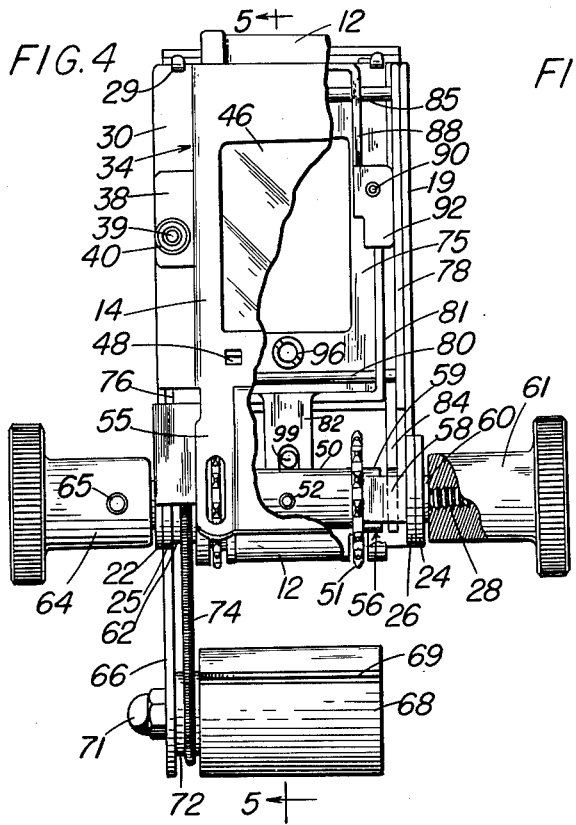
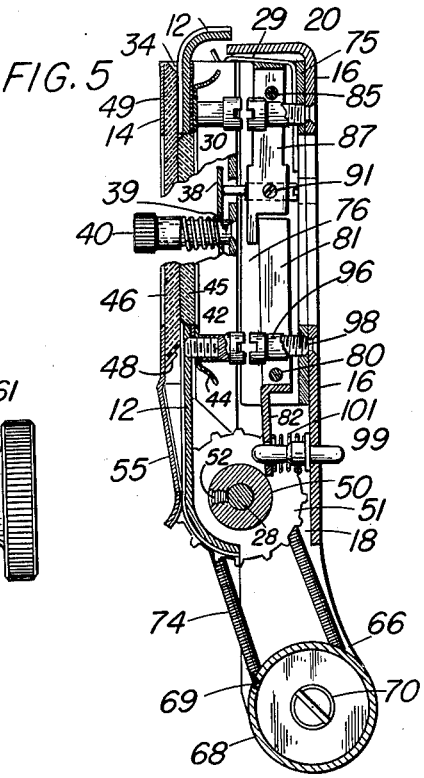
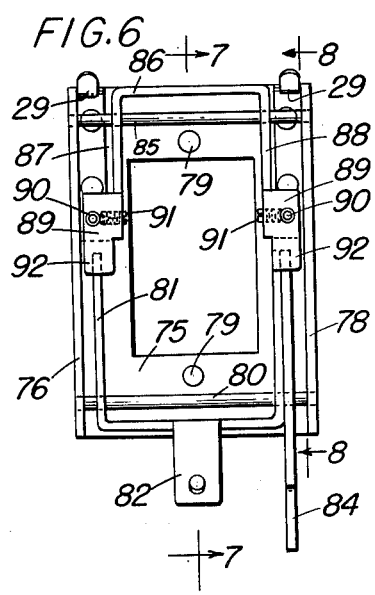
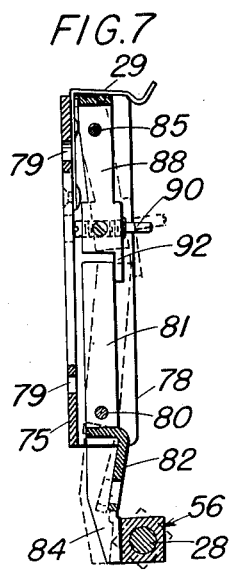
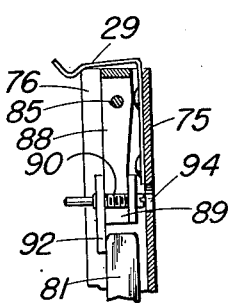
INVENTORS
Florindo J. Perillo
David Pollan
By Williams, Rich & Moore
Attorneys Patented May 6, 1952

2,595,978

UNITED STATES PATENT OFFICE 2,595,978

FILMSTRIP TRANSPORTING MECHANISM

Florindo J. Perillo, Jackson Heights, and David Pollan, Sunnyside, N. Y., assignors to Viewlex, Inc., Queens County, N. Y., a corporation of New York Application April 12, 1950, Serial No. 155,464

10 Claims. (Cl. 88—28)

The present invention relates to filmstrip handling devices, more particularly to a self-contained unit in the nature of an adaptor or accessory for use in printers, projectors or other types of transparency viewers and the like.

The general object of the invention is to provide a unitary structure which performs all of the necessary and desirable functions in the handling of filmstrips including film transport, framing, indicating or indexing, pressure plate separation during movement of the film and automatic film take-up.

Other objects of the invention are to provide for adjustment of the normal degree of separation of a pair of pressure plates, to provide for the ready insertion and removal of masks having openings suitable for use with image areas of different sizes and to provide a device in which all the parts are readily accessible for cleaning and adjustment.

Another object is to provide a unit which will perform the foregoing functions with a minimum of parts, at the same time providing for ease and economy of manufacture and assembly and ruggedness of construction.

Another object is to provide film transporting mechanism including a sprocket wheel from which a film may readily be pulled without movement of the sprocket wheel and without damage to the sprocket holes of the film.

A further object is to provide for the ease and accurate mounting of the unit in a projector or other device.

Other objects and advantages will in part appear and in part will be obvious from the present preferred embodiment of the invention taken in conjunction with the drawings in which:

Fig. 4 is a rear elevation of the unit in closed position with the front and rear film guide frames and associated parts partly broken away;

Fig. 5 is a central sectional elevation of the unit taken on the line 5—5 of Fig. 4 with parts of the front and rear film guide frames broken out to show the resilient attaching means for the rear film guide frame;

Fig. 6 is an elevation of the separator sub-assembly composed of the fork and yoke assembled in their bearing channel;

Fig. 7 is a central sectional elevation taken on the line 7—7 of Fig. 6; and

Fig. 8 is a sectional elevation of the upper part of the sub-assembly shown in Fig. 6 taken on the line 8—8 thereof.

Figure 1:
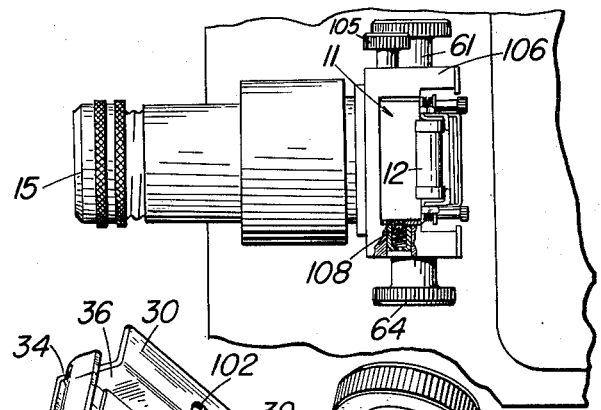
Fig. 1 is a fragmentary plan view of the front end of a projector showing the filmstrip transporting unit in position.
Figure 2:
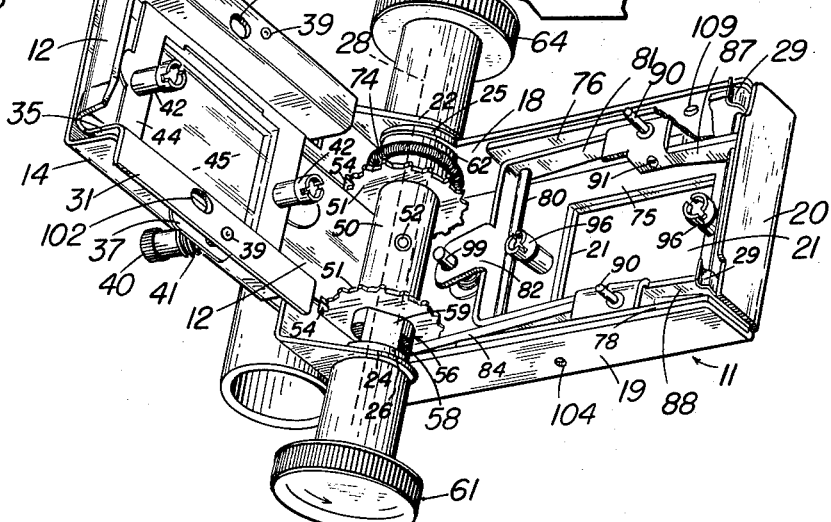
Fig. 2 is an inside view of the filmstrip unit with the two principal frame members swung into open position to give access to the internal parts.
Figure 3:
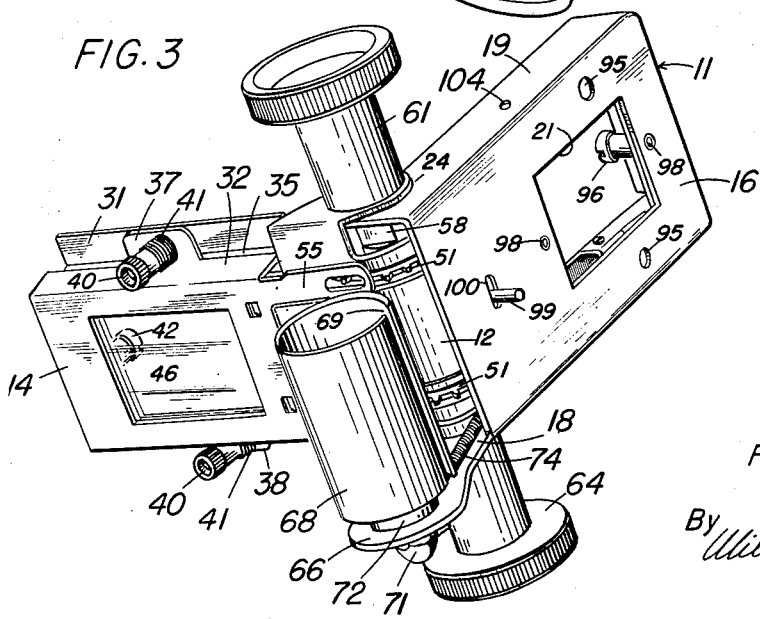
Fig. 3 is an outside view of the mechanism with the parts in the position shown in Fig. 2.

Referring to the drawings, particularly Figs. 2 and 3, the filmstrip transporting mechanism of the invention comprises a box-like structure which opens and closes around a hinge point at one end so as to give ready access to the parts situated on the inside. This structure comprises three main frame elements, namely, the front box frame 11, the front guide frame 12 and the rear guide frame 14. The parts are referred to for convenience as "front" and "rear" in accordance with the position which they occupy when mounted in a projector as shown in Fig. 1, front being toward the lens 15.

The front box frame 11 consists of the flat plate 16 with the turned-up side flanges 18 and 19 and end flange 20. Plate 16 is provided with a window 21 which preferably is the size of a "double frame" picture, the illustrated unit being adapted for use with 35 mm. film having image areas of either single or double frame size.

The front guide frame 12 is provided with bent-up ears 22 and 24 which lie outside of the enlarged ends 25 and 26 of the sides 18 and 19, respectively. The two frame members 11 and 12 are hinged together at these points on the axis of a shaft 28, indicated in dotted lines in Fig. 2, in a particular manner hereinafter described, so that they are movable from the closed position shown in Figs. 4 and 5 to the open position shown in Figs. 2 and 3. They are held in closed position by a pair of locking clips 29 having curved ends which snap over the top ends of the side flanges 30 and 31 of the front guide frame 12. In closed position the latter flanges rest on the edges of the side frames 18 and 19 of the box frame 11. The upper and lower ends of frame 12 are curved forwardly toward frame 11 as is best shown in Fig. 5.

Referring particularly to Figs. 3 and 4, the rear guide frame 14 has sides 32 and 34 which telescope over the sides 35 and 36 of frame 12. Extending outwardly from the sides 32 and 34 are ears 37 and 38 which are engaged by resilient retaining means consisting of studs 39 secured in the flanges 30 and 31, threaded at their outer ends to receive the nuts 40 and passing freely through openings in said ears. Surrounding the studs 39, bearing against the ears and compressed by the nuts 40 are the springs 41.

On its inner face, the front guide frame 12 is provided with a pair of threaded studs which receive the nuts 42, these serving to hold in place a metal frame 44 which carries a glass pressure plate 45. Frame 44 has side flanges which grip the plate by its edges. The nuts 42 may also be used to secure in place, over the frame 44, a second frame or mask (not shown) having a smaller aperture suitable for pictures of single frame size. It will be understood that the glass plate 45 extends through a suitable aperture in frame 12, extending slightly beyond the rear face thereof, as shown in Fig. 5. The rear glass pressure plate 46 is carried on the front surface of rear guide frame 14, being secured at the bottom by struck-up ears 48 and at the top by cement applied to the surface 49.

Referring to Fig. 2, there is secured centrally on the shaft 28 a sprocket wheel assembly consisting of a hub 50 and toothed flanges 51. The hub 50 is locked securely to the shaft by a set screw 52. The sprocket flanges extend through slots 54 in frame 12 so as to engage the sprocket holes in a film (not shown) passing between the glass pressure plates 45 and 46. The rear guide frame 14 is provided at its lower end with a slotted tail piece 55 (Figs. 3, 4 and 5) which presses against the film under the influence of springs 41 and keep it in contact with the sprocket flanges 51. Due to the yielding support of the entire frame 14, however, it is possible to pull the film out from between the front and rear guide frames without turning the sprocket and without injuring the sprocket holes.

Also mounted on shaft 28 between the lower sprocket flange 51 (as shown in Fig. 2) and the enlarged end 26 of the side 19 of box frame 11 is an indexing cam generally indicated at 56. This cam is provided with two sets of camming surfaces, the outer set 58 having four flat sides and the inner set 59 having two flat sides. The inner end of the cam has a flat surface which bears against the adjacent sprocket flange 51 and its outer end is in the form of a cylindrical sleeve which extends through the enlarged end 26 and the ear 24 forming one of the hinge pivots. The outer end of the cam, indicated at 60 in Fig. 4, is thus engageable by the face of a knob 61 which is threaded on the shaft 28, preferably with a left-hand thread so that when the knob is turned in a direction to transport the film downwardly it tends to tighten. This knob, however, is not used primarily for transport but is utilized to lock and unlock the cam 56. It will readily be seen that when knob 61 is tightened on shaft 28 it will clamp the cam against the sprocket thus preventing its rotation on the shaft. Loosening the knob will permit the shaft to be rotated, carrying the sprocket with it, without rotation of the cam, and this enables the film to be framed with reference to the apertures in the device, the cam being locked after framing and the cam thereafter serving as an indexing device through means to be described later.

Between the opposite end of the sprocket and the enlarged end 25 of side 18 is a grooved drive pulley 62 (Figs. 2 and 4). This pulley likewise has a cylindrical neck extending through the enlarged end 25 and the ear 22 and is permanently locked against the adjacent sprocket flange 51 by the knob 64 which is tightened against the end of the pulley neck and locked in this position by the set screw 65. Knob 64 is the one normally used for film transport, the other knob 61 serving primarily as a lock for use in connection with framing, although it can be used for film transport in a normal downward direction when in locked position. Knob 64 may also be used to hold shaft 28 stationary while unlocking the cam, which may be necessary if it has been locked very tightly.

As may best be seen in Figs. 3, 4 and 5, the side 18 of box frame 11 is extended downwardly to provide a bracket 66 on which is rotatably mounted a take-up spool 68 having a slot 69 into which the end of the film may be inserted. This spool rotates freely on a shouldered screw 70 held in place by a cap nut 71 and surrounding the screw the spool is provided with an integral grooved pulley portion 72. The two pulleys 72 and 62 are connected by a drive spring 74 so that the spool rotates with the sprocket, whereby film issuing from between the two guide frames will be wound up on the spool 68. The spring drive permits the spool to slip if one wishes to pull the film off longitudinally. A film-strip completely wound on the spool can be removed endwise of the spool since slot 69 is open-ended.

Cam 56 serves not only as an indexing means, in a manner to be described, but also actuates mechanism for separating the front and rear pressure plates 45 and 46 during the periods when the film is in motion between them for the usual purpose of preventing abrasion of the film by dust particles. This mechanism consists in part of the sub-assembly illustrated in Figs. 6–8 which comprises a bearing plate 75 having upstanding sides 76 and 78 and being perforated at 79. Pivotally mounted in the lower ends of these sides is a shaft 80 carrying a shiftable U-shaped fork 81 having an integral perforated tongue 82 and carrying a downwardly extending indexing lever 84 which may be welded or screwed to one leg of the fork. Mounted in the upper ends of the sides 76 and 78 is a second shaft 85 on which is pivotally mounted a yoke 86 having downwardly extending arms 87 and 88, the ends of which are bent as shown in the drawings to form U-shaped portions 89 which are tapped to receive threaded pins 90. The pins 90 are held in adjusted position by set screws 91. The rear legs 92 of the U-shaped portions 89 are longer than the front legs and overlie the upper ends of the fork 81 so that rearward movement of the ends of the fork will move rearward the lower ends of the yoke as shown in dotted lines in Fig. 7. Overlying the slotted ends of the pins 90, bearing plate 75 is perforated at 94 (Fig. 8) and these perforations are aligned with corresponding perforations 95 (Fig. 3) in the flat plate 16 of box frame 11. This allows adjustment of the pins 96 by a screw driver inserted through the perforations when the device is completely assembled and closed as in Fig. 5. It will be noted that the locking clips 29 are riveted to the bearing plate 75 and this plate, as shown in Fig. 2, is secured in the box frame 11 by means of nuts 96 which attach to threaded studs 98 secured in plate 16.

The end of indexing lever 84 bears against one or the other of the sets of camming surfaces of the indexing cam 56, depending on the position it is shifted into. Shifting of fork 81 and lever 84 is accomplished by means of a shouldered stud 99 (Fig. 5) which extends through an elongated slot 100 (Fig. 3) in plate 16, its shoulder sliding on the inside surface of this plate. The inner end of the pin passes through the opening in the tongue 82 of the fork. To hold the fork in retracted position and at the same time to press the lever 84 against the cam 56, pin 99 is surrounded by a stiff coil spring 101.

The function of cam 56 and lever 84 as indexing mechanism will be appreciated from Fig. 7. In full lines the cam is illustrated with a flat side resting against the face of the lever. When cam 56 is rotated it moves the lever against the force of spring 101 which creates resistance to the turning of the knob 64. When the cam has rotated nearly a quarter turn the lever snaps back into position against the next flat side of the cam with a spring action which is readily apparent to the operator. A quarter turn of the shaft 28 and sprocket flanges 51 is equivalent to the linear distance on the filmstrip from one single frame to another. If the fork 81 and lever 84 are shifted so that the lever bears against the cam surfaces 59, the shaft will of course be rotated a half revolution to produce the same effect. This corresponds to the linear distance between double frame pictures. It will be observed that the cam 56 not only performs this indexing function but at the same time actuates the pressure plate separating mechanism comprising the fork 81 and yoke 86. As the ends of the fork and yoke move rearward into the dotted line position shown in Fig. 7 the pins 90, which pass through openings 102 in the flanges 30 and 31 into engagement with the ears 37 and 38, move the rear guide frame 14 away from the front guide frame 12, thus separating the glass plates 45 and 46 so that the film can move freely between them. Preferably, the pins 90 are so adjusted as to produce a normal or minimum separation between the glass plates 45 and 46 slightly in excess of the thickness of the film so that there is no lost motion in the plate separating linkage. The function of the glass plates is not to grip the film but merely to flatten it so that it lies in a plane.

Referring to Figs. 2 and 3, it will be noted that there is a small hole 104 in the side flange 19 of box frame 11. This hole is engaged by the point of a set screw 105 which extends through the wall of the supporting head 106 of the projector (Fig. 1). In order to align the hole 104 with the set screw 105, which is of course retracted when the device is inserted in the head 106, the opposite side of the channel in head 106 is provided with a protruding spring-pressed ball 108 which engages with a hole 109 in the other side flange 19. Snapping of the ball into this hole is readily perceived and when the device is thus positioned the set screw is tightened to engage the hole 104. The pressure of the ball also serves to prevent the device falling out of the head when the set screw is loosened.

From the foregoing detailed description of the mechanism, the operation thereof will for the most part be evident. The manner of use will, however, be summarized briefly as follows: The filmstrip adaptor is inserted in the projector in the manner just described. With the cam 56 locked to rotate with shaft 28 by the tightening of knob 61, knob 64 is turned to bring one of the high points on the cam to bear against indexing lever 84 thus separating the guide plates 45 and 46. The end of a filmstrip is then pushed downwardly between the guide plates into contact with the sprocket flanges 51. Further turning of knob 64 will automatically thread the film onto the sprocket which is turned until a few inches of film protrude at the bottom. The end of the film is then slipped into the slot 69 of take-up spool 68. Knob 61 is then loosened which releases the cam so that it is rotatable on the shaft 28 and the first picture on the filmstrip is framed in the opening by turning knob 64. Knob 61 is again tightened. By moving the pin 99, which is accessible from the outside of the front face of the adaptor beneath the projector head, the lever 84 is moved to bear on the proper cam surface, depending upon whether the filmstrip carries single or double frame pictures. If the pictures are evenly spaced, the filmstrip is then transported through the adaptor picture by picture until it is finished. If there is any irregularity in the placement of the pictures requiring reframing, this is simply accomplished as above described. It will be understood, of course, that if the filmstrip carries single frame pictures, a suitable mask will be placed on the inside of the front guide frame 12, where it is held by the nuts 42, before the adaptor is placed in the projector. The hinged construction of the adaptor gives ready access to the interior for this purpose as well as for cleaning of the inside surface of the pressure plate 45 and oiling of movable parts. By simply removing the screws 40, the rear guide frame 14 can be removed, giving access to the adjacent faces of the pressure plates 45 and 46.

Since many modifications in the details of construction may be made without departing from the spirit of the invention as defined in the appended claims, it is to be understood that the invention is not limited to those details which are spicifically described above for the purpose of illustrating the invention. The words "front" and "rear" have been used for convenience in describing certain parts but they are purely relative terms. In the claims the frame parts may sometimes be referred to as the box frame (11), the cover frame (12) and the pressure plate frame (14) without reference to the relative positions they may occupy when in use.

What is claimed is:

1. In filmstrip transporting mechanism having separable pressure plates held together by resilient means, separating means for said plates comprising, a box frame having side flanges extending at right angles to a flat plate, a pair of spaced parallel shafts mounted in said frame, a fork pivotally supported on one of said shafts with its legs extending parallel to said flanges, said fork having a tongue extending in the opposite direction from said legs, a stud mounted in said flat plate and extending through said tongue, a compression spring surrounding said stud and pressing against said tongue, a yoke pivotally mounted on the other of said shafts and having ends engageable by the ends of said fork, pins carried by and extending outwardly from the ends of said yoke, said fork having a lever portion, a cam adapted to move said lever, and means attached to one of said pressure plates adapted to be acted on by said pins.

2. In filmstrip transporting mechanism having separable pressure plates held together by resilient means, separating means for said plates comprising, a box frame having side flanges extending at right angles to a flat plate, a pair of spaced parallel shafts mounted in said frame, a fork pivotally and slidably supported on one of said shafts with its legs extending parallel to said flanges and spaced therefrom to permit sliding of the fork, said fork having a tongue extending in the opposite direction from said legs, a shouldered stud slidably mounted in said flat plate and extending through said tongue, a compression spring surrounding said stud and pressing against said tongue, a yoke pivotally mounted on the other of said shafts and having ends engageable by the ends of said fork, pins carried by and extending outwardly from the ends of said yoke, said fork having a lever portion, a cam adapted to move said lever having two sets of camming surfaces selectively engageable by sliding said fork on its shaft through movement of said stud, and means attached to one of said pressure plates adapted to be acted on by said pins.

3. In filmstrip transporting mechanism having separable pressure plates held together by resilient means, separating means for said plates comprising, a box frame having side flanges extending at right angles to a flat plate, a flanged bearing plate adapted to fit closely between said side flanges, a pair of spaced parallel shafts mounted in the flanges of the bearing plate, a fork pivotally supported on one of said shafts with its legs extending parallel to said flanges, said fork having a tongue extending in the opposite direction from said legs, a stud mounted in said flat plate and extending through said tongue, a compression spring surrounding said stud and pressing against said tongue, a yoke pivotally mounted on the other of said shafts and having ends engageable by the ends of said fork, pins carried by and extending outwardly from the ends of said yoke, means securing the bearing plate to said flat plate, said fork having a lever portion, a cam adapted to move said lever, and means attached to one of said pressure plates adapted to be acted on by said pins.

4. In filmstrip transporting mechanism having separable pressure plates held together by resilient means, separating means for said plates comprising, a box frame having side flanges extending at right angles to a flat plate, a flanged bearing plate adapted to fit closely between said side flanges, a pair of spaced parallel shafts mounted in the flanges of the bearing plate, a fork pivotally and slidably supported on one of said shafts with its legs extending parallel to said flanges and spaced therefrom to permit sliding of the fork, said fork having a tongue extending in the opposite direction from said legs, a shouldered stud slidably mounted in said flat plate and extending through said tongue, a compression spring surrounding said stud and pressing against said tongue, a yoke pivotally mounted on the other of said shafts and having ends engageable by the ends of said fork, pins carried by and extending outwardly from the ends of said yoke, means securing the bearing plate to said flat plate, said fork having a lever portion, a cam adapted to move said lever having two sets of camming surfaces selectively engageable by sliding said fork on its shaft through movement of said stud, and means attached to one of said pressure plates adapted to be acted on by said pins.

5. In filmstrip transporting mechanism, in combination, a box frame, a cover frame, said frames having aligned openings adjacent their ends forming part of a hinge joint, a rotatable shaft having threaded ends extending through said openings, a sprocket fixed on the shaft intermediate its ends and spaced from said frames, a cam rotatable on the shaft and positioned between one end of the sprocket and the innermost frame and having a cylindrical neck extending through the adjacent openings in said frames and slightly beyond the outer frame, a tapped knob screwed on the adjacent threaded end of the shaft and bearing against the end of said neck, whereby tightening of said knob forces the cam against the sprocket locking it on the shaft to turn therewith.

6. In filmstrip transporting mechanism, in combination, a box frame, a cover frame, said frames having aligned openings adjacent their ends forming part of a hinge joint, a rotatable shaft having threaded ends extending through said openings, a sprocket fixed on the shaft intermediate its ends and spaced from said frames, a cam rotatable on the shaft and positioned between one end of the sprocket and the innermost frame and having a cylindrical neck extending through the adjacent openings in said frames and slightly beyond the outer frame, a tapped knob screwed on the adjacent threaded end of the shaft and bearing against the end of said neck, a pulley on the shaft between the other end of the sprocket and the innermost frame and having a cylindrical neck extending through the adjacent openings in the frames and slightly beyond the outer frame, a second tapped knob screwed and locked on the adjacent threaded end of the shaft and tightened against the neck of the pulley, a take-up drum carried on one of said frames, and drive means connecting said pulley with said drum.

7. Filmstrip transporting mechanism comprising a box frame, a front guide frame, means connecting said frames together, a rotatable shaft passing through the space enclosed by the frames, means for rotating said shaft, a sprocket wheel mounted on said shaft and having toothed flanges extending through said front guide frame to engage the filmstrip, a rear guide frame resiliently secured against the outer face of said front guide frame by a pair of springs anchored to said front guide frame and pressing against the rear face of said rear guide frame intermediate its ends and on opposite sides thereof, said rear guide frame having a tail piece at one end overlying said toothed flanges to hold the filmstrip in engagement therewith, a framing cam on said shaft, a fork pivotally mounted in the box frame and having a lever portion engaging said cam to be moved by the rotation thereof, a yoke pivoted in the box frame with its ends overlying the ends of the fork, a pair of pins carried by the yoke and bearing against the front face of the rear guide frame at points above said springs whereby the rear guide frame rocks about its tail piece as a fulcrum when lifted by said pins so as always to press the filmstrip against the flanges of said sprocket wheel, and transparent pressure plates carried by said front and rear guide frames.

8. Filmstrip transporting mechanism comprising a box frame, a front guide frame, means hingedly connecting said frames together adjacent their ends including a rotatable shaft passing through the space enclosed by said frames, means for rotating the shaft, a sprocket wheel mounted on said shaft having toothed flanges extending through said front guide frame, a rear guide frame resiliently secured against the outer face of said front guide frame, a framing cam on said shaft, a fork pivotally mounted in the box frame having a lever engaging said cam and an apertured tongue, a stud mounted in the box frame, a spring surrounding the stud and pressing against said tongue, a yoke pivoted in the box frame with its ends overlying the ends of the fork, pins carried by the yoke and bearing against the rear guide frame, means for holding the box frame and front guide frame in closed position, and glass pressure plates carried by said front and rear guide frames, all three of said frames having aligned openings in line with said pressure plates.

9. Filmstrip transporting mechanism comprising a box frame, a front guide frame, means hingedly connecting said frames together adjacent their ends including a rotatable shaft passing through the space enclosed by the frames, means for rotating the shaft, a sprocket wheel mounted on said shaft having toothed flanges extending through said front guide frame, a rear guide frame resiliently secured against the outer face of said front guide frame, a framing cam on said shaft within the box frame having double frame and single frame camming surfaces, a fork pivotally mounted in the box frame having a lever engaging said cam and an apertured tongue, a shouldered stud slidably mounted in the box frame with one end extending through the aperture in said tongue and the other end extending through a slot in said box frame, a spring surrounding the stud and pressing against said tongue, a yoke pivoted in the box frame with its ends overlying the ends of the fork, pins carried by the yoke and bearing against the rear guide frame, means for holding the box frame and front guide frame in closed position, and glass pressure plates carried by said front and rear guide frames.

10. A self-contained filmstrip adaptor for use in a projector or the like comprising a box frame, a cover frame, a shaft hingedly connecting said frames adjacent their ends, means external to said frames for rotating said shaft, a pressure plate frame removably and resiliently supported against the outer face of the cover frame, actuating mechanism driven from said shaft and mounted in the space between said box frame and said cover frame for transporting the filmstrip and simultaneously lifting the pressure plate frame away from the cover frame, aligned windows in all of said frames, transparent pressure plates supported in juxtaposition in the windows of the cover and pressure plate frames, whereby access may be had to said mechanism and to the inner face of the cover frame pressure plate by opening said box and cover frames on their hinge, and means for releasably retaining said box frame and said cover frame in closed position.

FLORINDO J. PERILLO.
DAVID POLLAN.

REFERENCES CITED

The following references are of record in the file of this patent:

UNITED STATES PATENTS

| Number | Name | Date |
|---|---|---|
| 1,172,567 | Schneider | Feb. 22, 1916 |
| 1,738,762 | De Vault | Dec. 10, 1929 |
| 2,126,474 | Kleerup | Aug. 9, 1938 |
| 2,231,765 | Landrock | Feb. 11, 1941 |
| 2,276,735 | Miller | Mar. 17, 1942 |

FOREIGN PATENTS

| Number | Country | Date |
|---|---|---|
| 594,056 | Great Britain | Oct. 31, 1947 |
| 594,057 | Great Britain | Oct. 31, 1947 |